United States Patent [19]

James

[11] 4,186,547
[45] Feb. 5, 1980

[54] MACHINE FOR HARVESTING SOFT FRUIT

[76] Inventor: Roland J. E. James, Kirkenel Farm, Ashford Carbonell, England

[21] Appl. No.: 908,550

[22] Filed: May 22, 1978

[30] Foreign Application Priority Data

May 23, 1977 [GB] United Kingdom ............... 21629/77

[51] Int. Cl.² ............................................ A01D 46/00
[52] U.S. Cl. ......................................... 56/330; 56/13.3
[58] Field of Search ...................... 56/330, 13.3, 12.8, 56/16.5

[56] References Cited

U.S. PATENT DOCUMENTS

| | | | |
|---|---|---|---|
| 3,720,050 | 3/1973 | Rozinska | 56/330 |
| 4,083,773 | 4/1978 | Clary | 56/330 |

FOREIGN PATENT DOCUMENTS 1390495  4/1975  United Kingdom ...................... 56/330

*Primary Examiner*—Jay N. Eskovitz
*Attorney, Agent, or Firm*—Kemon and Estabrook

[57] ABSTRACT

A machine for harvesting black currants or other soft fruit comprises a frame, ground engaging wheels for supporting the frame, traction means for driving the frame over the ground along a row of soft fruit bushes, a picking zone defined by said frame, guides for guiding branches of each bush into the picking zone as the machine traverses the bush, rotary shakers for engaging the branches in the picking zone and shaking fruit therefrom and fruit collecting means directly below the picking zone for collecting fruit shaken from the branches. The machine is provided with a longitudinally extending open top channel into which fruit can fall, a fan for providing a flow of air along the channel and ducting connecting the fan to the open top channel so as to provide a current of air along the channel to convey the fruit along the channel.

8 Claims, 3 Drawing Figures

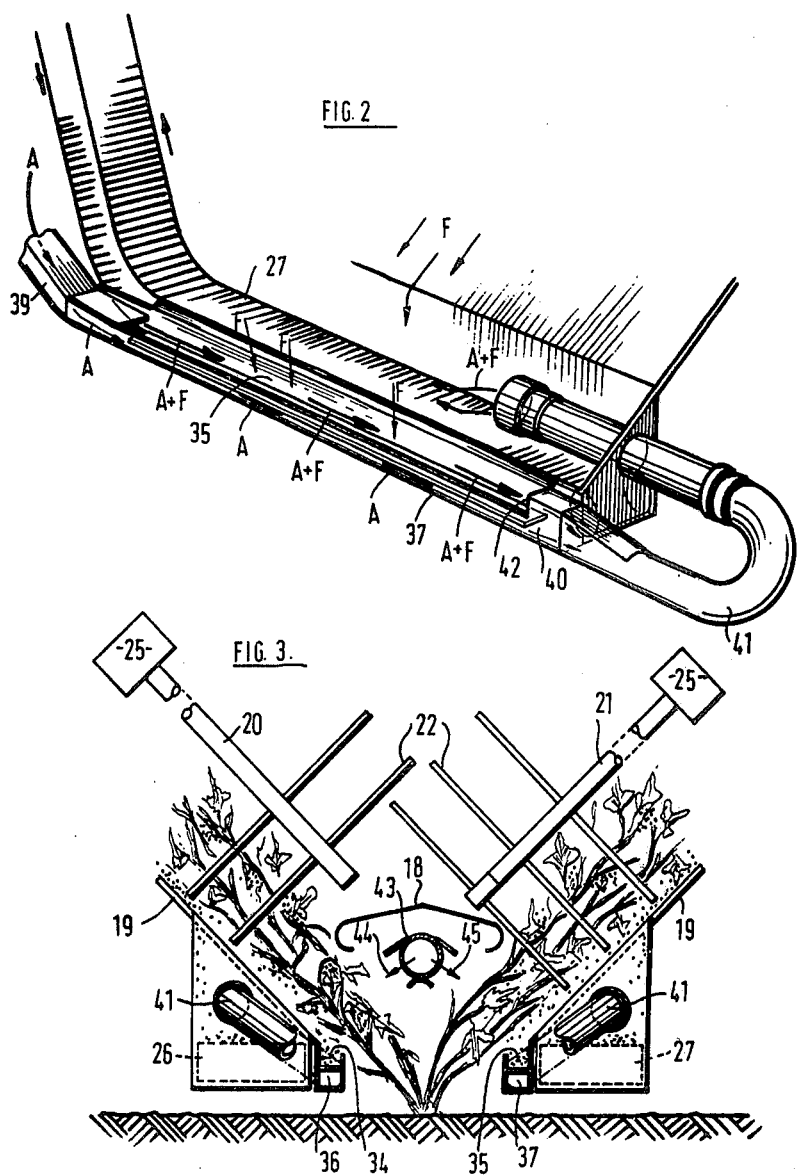

MACHINE FOR HARVESTING SOFT FRUIT

BACKGROUND TO THE INVENTION

In a typical soft fruit harvesting machine, for example for black currants, the machine traverses a row of fruit bushes and has guides for deflecting the branches of the fruit bushes laterally outward into a picking zone where shakers shake the branches and cause the fruit to fall. A conveyor or other collecting means is arranged below the picking zone to collect the fruit. A conventional conveyor has to be set well to the side of the center of the bush so that there is space under the branches for the substantial depth of the conveyor. Thus fruit near the center of the bush after the deflecting (i.e. fruit which is down low) tends to fall to the ground clear of the conveyor. This problem is so severe with short young fruit bushes that the fruit has to be collected by hand.

A different type of machine is used for harvesting gooseberries, partly because gooseberry bushes tend to be a different shape and size from black currant bushes. A commercial gooseberry bush has a single vertical stem about 25 cm high and several branches extending out from the top of the stem. A suitable machine has a central picking zone and a single horizontal rotary shaker shaft. A large proportion of the fruit falls near the center of the bush where it can not be collected by a conventional conveyor.

It is a primary object of the invention to provide an improved harvester for soft fruit in which fruit near the center of a bush can be harvested by machine.

Other objects and advantages will become apparent from the following description of the invention.

SUMMARY OF THE INVENTION

According to one aspect of the present invention I provide a machine for harvesting black currants or other soft fruit of the kind in which at least one shaker engages a bush and shakes fruit therefrom so that fruit falls on to a fruit collecting means wherein the fruit collecting means consists of or includes an open top channel into which fruit can fall and means for directing a current of air along the channel to convey the fruit along the channel.

Preferably the current of air is provided by an inlet orifice at or near one end of the channel connected to an air flow source and directing air towards the opposite end of the channel and an outlet orifice at or near said opposite end of the channel and connected to air flow means for drawing air away from the channel.

The machine may additionally be provided with means for directing a flow of air through a fruit bush towards the channel to tend to deflect fruit shaken from the bush towards the channel.

Further fruit collecting means may be provided, outwardly of the open top channels.

According to a second aspect of the invention I provide a machine for harvesting black currants or other soft fruit comprising a frame, ground engaging wheels for supporting the frame, traction means for driving the frame over the ground along a row of soft fruit bushes, a picking zone defined by said frame, guides for guiding branches of each bush into the picking zone as the machine traverses the bush, rotary shakers for engaging the branches in the picking zone and shaking fruit therefrom, fruit collecting means directly below the picking zone for collecting fruit shaken from the branches and comprising a longitudinally extending open top channel into which fruit can fall, a fan for providing a flow of air and ducting connecting the fan to the open top channel so as to provide a current of air along the channel to convey the fruit along the channel.

BRIEF DESCRIPTION OF THE DRAWINGS

In the accompanying drawings:

FIG. 2 is a diagrammatic perspective view of the fruit collecting and conveying means of FIG. 1; and FIG. 3 is a diagrammatic cross section of part of the machine showing an optional additional air supply.

DESCRIPTION OF THE PREFERRED EMBODIMENTS

Figure 1:
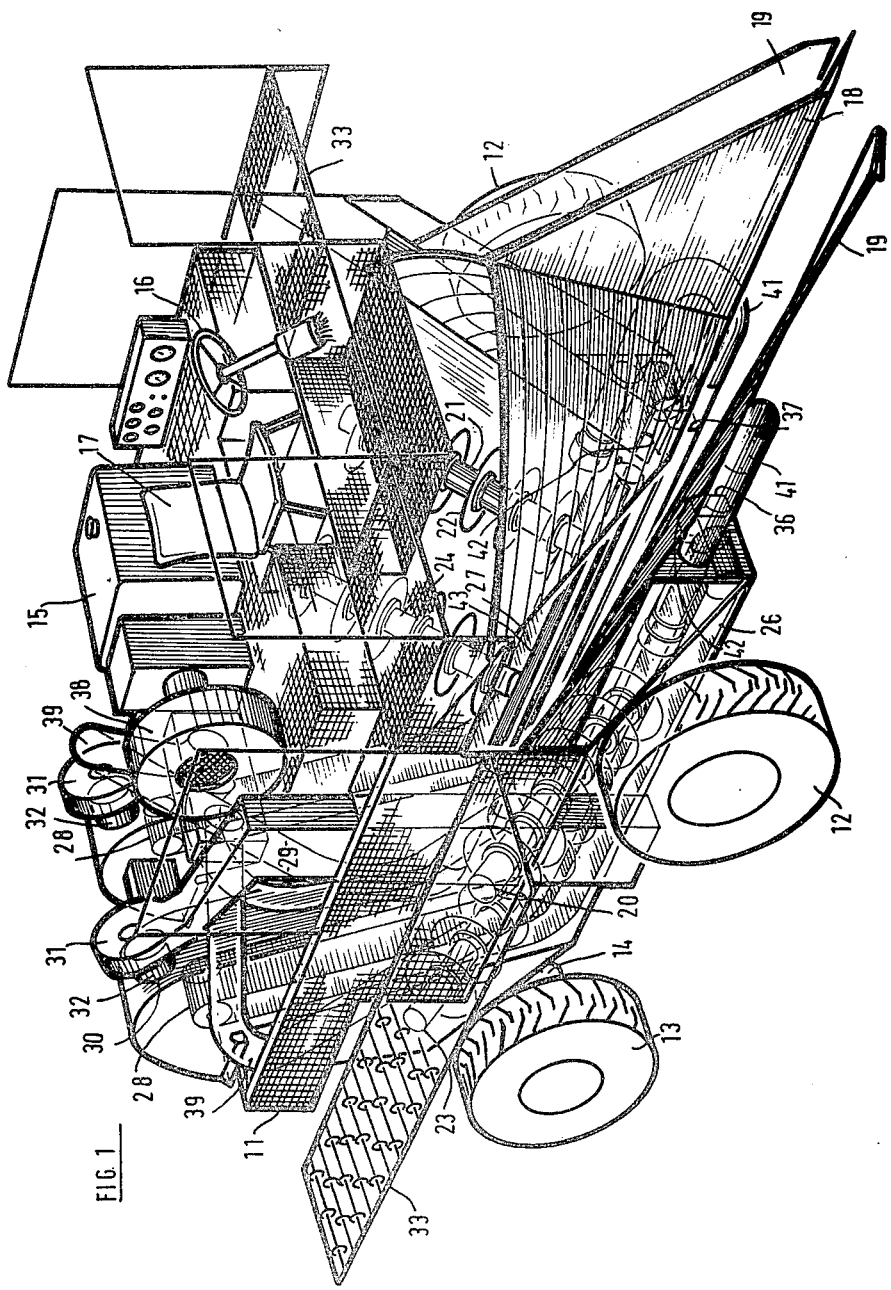
FIG. 1 is a perspective view of a soft fruit harvester according to the invention.

The harvester incorporates a frame or main structure 11, fabricated by welding together several steel plates. The frame is supported on two front wheels 12 and two rear wheels 13. Traction is provided by hydraulic motors 14 for the rear wheels which are driven from an engine 15. The front wheels are steerable from a steering wheel 16 by a driver sitting in a seat 17.

The front of the machine is provided with a central guide 18 and two side guides 19. As the machine is driven along a row of black currants, the central guide divides each bush in turn so that the branches are deflected outward. The side guides limit the outward deflection and pick up any low lying branches so that all branches are guided into two sections as they arrive at a picking zone of the machine, best seen in FIG. 3, which shows the rear parts of the guides 18 and 19.

A pair of forward shaker shafts 20 and 21 are mounted for rotation on the frame and are driven in a manner which will be described subsequently. Each shaker shaft carries a plurality of radially extending shaker tines 22 (shown diagrammatically in FIG. 1) and as can be seen these tines traverse the picking zone and engage in the branches of the bush. The general speed and direction of rotation of the shaker shafts is such that the tines engaged with the bush tend to move backward with respect to the motion of the frame at the same speed as the frame moves forward. Thus the tines are generally almost stationary with respect to the bush and do not bodily drag it forward or hold it back. Superimposed on the general rotation of the tines is a vibratory movement which causes the tines to shake the branches sufficiently to cause fruit to drop off the branches. A second pair of tined shaker shafts 23 and 24 (see FIG. 1) is provided behind the shaker shafts 20 and 21. In the first pair of shaker shafts 20 and 21 the tines on the right hand shaft 21 extend down lower than those on the left hand shaft 20 and on the second pair the tine arrangement is reversed so that some low tines are provided at each side of the machine.

The four shaker shafts are driven by hydraulic motors 25, shown diagrammatically in FIG. 2, from the engine 15.

The longitudinally extending slatted conveyors shown diagrammatically at 26 and 27 act as fruit collecting means for fruit which falls on to them directly from above and each then conveys the fruit rearwardly and upwardly to a termination 28 where the fruit falls over the end of the conveyor and is loaded into boxes positioned below the end of the conveyor. The conveyors 26 and 27 are driven hydraulically from the engine 15. In a mature bush, the branches are long and most of the fruit grows well up the bush so that most of the fruit falls on to the conveyor. However, with young bushes, much of the fruit is low down so that it would fall between the two conveyors.

In use, there is a tendency for some leaves and other light-weight debris to be shaken from the bushes and to be collected with the heavier fruit. This debris is blown away by a supply of air through ducts 29 directed at the conveyors 26 and 27 and provided by fans 31 driven from the engine 15 by further hydraulic motors 32. Thus very little debris reaches the ends of the conveyors for collection with the fruit in boxes. The machine is provided with storage racks 33 for a supply of boxes so that as one box becomes full another box can take its place and be filled.

As thus far described the machine is entirely conventional. The additional components associated with the invention are intended to restrict loss of fruit between the conveyors.

Two open top longitudinally extending channels 34 and 35 are provided adjacent the conveyors 26 and 27 between these conveyors and the center of the bush. The region below each open top channel is closed off by a transverse wall so as to provide two enclosed ducts 36 and 37. FIG. 2 shows the general nature of air flow along one of the channels when the harvester is in operation. A supply of air from an engine driven fan 38 is directed by means of ducting 39 to an inlet orifice 30 at the inlet end of each channel 34, 35. At the inlets to the channels the air flow divides so that some of the air flows along the closed ducts 36 and 37 while some flows in to the open channels 34 and 35. At the outlet end of each duct 36 and 37 air escapes through an orifice 40 formed by the end of the duct into further ducting 41 which leads upward and outward and then rearward so that it terminates just above the conveyors 26 and 27. The inlets to ducting 41 each has the same cross section as the associated channel 34 or 35 and duct 36 or 37 and thus the flow of air into ducting 40 from the duct 36 or 37 draws air in from the open channel 34 or 35 through an outlet orifice 42.

The effect of an air supply to one end of each open top channel 34 or 35 combined with drawing out of air from the other end of the channel is that there is a continuous flow of air along each channel from one end to the other.

In use of the whole machine, some black currants which are shaken off by the tines fall into the channels 34 and 35. These are conveyed along these channels by the flow of air and are then carried in the air flow up the ducting 41 and are deposited on conveyor 26 or 27. From there they are deposited in trays along with other black currants which had fallen direct on the conveyor. In FIG. 2, a series of arrows referenced A for air, F for fruit and A+F for air and fruit indicate the flow of air and fruit.

A central air duct 43 may also be provided and supplied with air from the motor driven fan. The duct 43 has lateral outlets which direct currents of air indicated by arrows 44 and 45 in a laterally outward direction through the lower parts of the branches of the bush. This flow of air tends to deflect falling currants in an outward direction into the channels 34 and 35. Air from duct 43 may also help to prevent a large volume of air from escaping from the channels 34 and 35 and thereby help to provide a steady air flow along the channels.

The effect of the channels 34 and 35 is to collect currants which would otherwise fall to the ground. In this way it becomes possible to use the harvester on young bushes without losing a substantial proportion of the crop. It should be noted that this effect could not be achieved simply by moving the conveyors closer together because there would be insufficient height for a conventional conveyor close to the bush. Also, it is far simpler to remove the channels 34 and 35 and associated ducts if desired, to harvest from wide bushes or bushes which may be slightly off-set from a straight row, than to provide adjustability for the conveyors.

If there is insufficient height below the bushes for the channels 34 and 35 with integral ducts, shallow channels without ducts may be provided and the air at the orifice at the outlet end of each channel would be provided along an alternative route.

For a gooseberry harvester the nature and shape of the bushes is such that wide low channels are required. Also, the bush is not divided into two and a horizontal transverse shaker shaft may be provided in place of the inclined shaker shaft. In such a case, most of the fruit would tend to fall near the center of the machine where there is little space below the bushes so that a collection means such as the open channels is particularly important.

The invention may also be applied to machines for harvesting other type of soft fruit besides black currants and gooseberries.

I claim:

1. A machine for harvesting soft fruit and of the kind comprising a frame, ground engaging wheels for supporting said frame, traction means for driving said frame over the ground along a row of soft fruit bushes, a picking zone defined by said frame, guides for guiding branches of each bush into said picking zone as the machine traverses the bush, shakers for engaging the branches in said picking zone and shaking fruit therefrom, and fruit collecting and conveying means below said picking zone for collecting fruit shaken from the branches, wherein the fruit collecting means comprises a longitudinally extending open top channel into which fruit can fall and means for providing a flow of air along the channel to convey fruit along the channel, comprising an air flow source, an inlet orifice at or near one end of the channel operatively connected to said source and directed towards the opposite end of the channel, and an outlet orifice at or near said opposite end of the channel and air flow means for drawing air away from the channel operatively connected to said outlet orifice.

2. A machine according to claim 1 further comprising a fruit conveying duct connected to said outlet orifice and along which the fruit can be directed by a current of air.

3. A machine according to claim 2 further comprising a mechanical conveyor and wherein said duct leads in an upward direction and is arranged to deposit fruit on to said mechanical conveyor.

4. A machine according to claim 1 wherein the air flow means associated with the outlet orifice comprises a duct into the inlet of which lead both said outlet orifice and further means for directing a flow of air into the duct.

5. A machine according to claim 4 wherein the further means for directing a flow of air into the duct is constituted by means defining an air passage leading under the open top channel.

6. A machine according to claim 1, comprising means for directing a flow of air through a fruit bush towards said channel to tend to deflect fruit shaken from the bush towards the channel.

7. A machine according to claim 1 having two such open top channels, one arranged to pass each side of a row of fruit bushes.

8. A machine according to claim 7 further comprising further fruit collecting means outwardly of the open top channels.

* * * * *